United States Patent [19]
Kim et al.

[11] Patent Number: 6,101,567
[45] Date of Patent: Aug. 8, 2000

[54] PARALLEL BACKPLANE PHYSICAL LAYER INTERFACE WITH SCALABLE DATA BANDWIDTH

[75] Inventors: Chang H. Kim, Whippany; Mark H. Kraml, Flanders, both of N.J.

[73] Assignee: Lucent Technologies Inc., Murray Hill, N.J.

[21] Appl. No.: 09/090,082

[22] Filed: Jun. 3, 1998

[51] Int. Cl.[7] .................................................. G06F 13/00
[52] U.S. Cl. .......................... 710/129; 710/131; 709/249
[58] Field of Search .................................. 395/281–283, 395/284, 285, 287, 306–312; 709/217, 219, 232, 233, 238, 245, 248–250

[56] References Cited

U.S. PATENT DOCUMENTS

| | | | |
|---|---|---|---|
| 5,122,691 | 6/1992 | Balakrishman | 307/475 |
| 5,524,254 | 6/1996 | Morgan et al. | 709/200 |
| 5,802,278 | 9/1998 | Isfeld et al. | 709/200 |
| 5,805,931 | 9/1998 | Morzano et al. | 395/884 |
| 5,822,551 | 10/1998 | Crane, Jr. et al. | 395/307 |
| 5,923,851 | 7/1999 | Gallagher et al. | 709/228 |

OTHER PUBLICATIONS

1. Institute of Electrical and Electronics Engineers (IEEE) Standard 1394–1995, "High Performance Serial Bus," 1995, pp. 1 and 313–314.

2. TSB14C01 Data Sheet, "5–V IEEE 1394–1995 Backplane Transceiver/Arbiter," Texas Instruments Inc., Dallas Texas, 1996.

*Primary Examiner*—Ayaz R. Sheikh
*Assistant Examiner*—Raymond N Phan

[57] ABSTRACT

An interface between a parallel backplane bus of a physical layer of a communication device and a higher layer of the device is provided in a manner compatible with a serial bus architecture such as IEEE 1394. The interface includes a parallel backplane physical layer controller having multiple receive data lines for receiving data from the backplane bus, and multiple transmit data lines for transmitting data to the backplane bus. A link layer controller is coupled to the parallel backplane physical layer controller, and communicates with the parallel backplane physical layer controller over a data bus. The parallel backplane physical layer controller can provide an effective data bandwidth which is greater than its operating clock rate. The parallel backplane physical layer controller may also be operative to support communications with the backplane bus using a plurality of different backplane bus widths, such as a single data bit bus width, a two data bit bus width, a four data bit bus width and an eight data bit bus width. The throughput data bandwidth of the interface can therefore be scaled by selecting one of the data bus widths supported by the parallel backplane physical layer controller.

20 Claims, 4 Drawing Sheets

PARALLEL BACKPLANE PHYSICAL LAYER INTERFACE WITH SCALABLE DATA BANDWIDTH

FIELD OF THE INVENTION

The present invention relates generally to a backplane interface operating in accordance with a standard such as IEEE 1394, and more particularly to a backplane interface suitable for use in controlling communications between a physical (PHY) layer backplane and a higher-level link layer in a network node or other communication device.

BACKGROUND OF THE INVENTION

FIG. 1 shows a conventional serial backplane interface 10 for interfacing a physical (PHY) layer backplane or other circuit to a link layer in a network node or other communication device. The interface 10 includes a link layer controller 12, a backplane physical layer controller 14, and a backplane transceiver 16. The link layer controller 12 and the physical layer controller 14 operate in accordance with the Institute of Electrical and Electronics Engineers (IEEE) Standard 1394–1995 for a High Performance Serial Bus, which will be referred to simply as the IEEE 1394 standard, and is incorporated by reference herein. The IEEE 1394 standard describes a serial bus for use as a peripheral bus or a backup to one or more parallel backplane buses. The backplane transceiver 16 of serial backplane interface 10 provides an electrical/mechanical interface to a serial backplane bus 17. Bidirectional backplane strobe signals (BPstrb+ and BPstrb−) and backplane data signals (BPdata+ and BPdata−) pass between the transceiver 16 and the serial backplane bus 17. Corresponding unidirectional transmit strobe (TSTRB), transmit data (TData), receive strobe (RSTRB) and receive data (RData) signal lines pass between the transceiver 16 and the PHY layer controller 14. The transceiver 16 is often packaged separately from the PHY layer controller 14 such that different transceivers can be used for different types of serial backplane buses. The type of transceiver used determines the packet transmission rate on the serial bus 17. For example, transceivers using BTL or Emitter-Coupled Logic (ECL) transmit and receive at 49.152 MB/sec, while transceivers using Enhanced Transceiver Logic (ETL) operate at 24.576 MB/sec.

The link layer controller 12 provides acknowledged one-way data transfer services via a host interface 18 with upper layers of nodes utilizing the serial backplane bus. For example, the controller 12 responds to read/write/lock requests from the upper layers of a node implementing the serial backplane interface 10, and it prepares packets for transmission through the PHY layer and onto the serial backplane bus 17. The link layer controller 12 also responds to changes in the state of the serial bus 17 (i.e., received data packets) as indicated by the PHY layer controller 14. Other functions of the link layer controller 12 include addressing, error checking and data framing (i.e., within a given packet). Information is transmitted bidirectionally between the link layer controller 12 and the PHY layer controller 14 using a data bus 20 including data lines DATA[0:7] and a control bus 22 including control signal lines CTL[0:1]. In a typical conventional implementation, only two of the DATA[0:7] data lines, i.e., data lines D0 and D1, are used. A system clock (SCLK) is supplied from the PHY layer controller 14 to the link layer controller 12. Link requests (LREQs) are transmitted unidirectionally from the link layer controller 12 to the PHY layer controller 14 as shown.

FIG. 2 illustrates the PHY layer controller 14 of serial backplane interface 10 in greater detail. The PHY layer controller 14 performs functions such as packet reception/transmission and arbitration, and includes a LINK/PHY interface 30, an arbitration control block 32, a data encode block 34, an arbitration/data multiplexer 36, and a data resynchronize/decode block 38. A reference clock (CLK) is used to provide synchronization of various state machines within the PHY layer controller 14. The frequency of this reference clock is 49.152 MHz (±100 ppm), regardless of the data transmission rate. The above-noted SCLK is derived from the reference clock. The four basic operations that can occur between the link layer controller 12 and the PHY layer controller 14 are request, status, transmit and receive, and all but the request operation are initiated by the PHY layer controller 14. The link layer controller 12 uses the request operation to read or write an internal PHY register or to request the PHY layer controller 14 to initiate a transmit operation. The PHY layer controller 14 initiates a status operation whenever the status of the serial bus 17 changes.

The PHY layer controller 14 initiates a transmit operation in response to a request from the link layer controller 12. The data bits to be transmitted are received over the data lines 20 from the link layer controller 12. These data bits are latched in the data encode block 34 of controller 14 in synchronization with the system clock SCLK, combined serially, encoded, and then transmitted by the arbitration/data multiplexer 36 on the TData line to the transceiver 16. The corresponding strobe information is transmitted by the arbitration/data multiplexer 36 on the TSTRB line to the transceiver 16. The PHY layer controller 14 initiates a receive operation whenever a packet is received on the serial bus 17. The packet data is received in the data resynchronize/decode block 38 on the RData line and the corresponding strobe information is received in block 38 on the RSTRB line. The received data-strobe information is decoded in block 38 to recover the receive clock (RxCLK) and the serial data bits. The serial data bits are then resynchronized to the local system clock, separated into two parallel streams, and sent to the associated link via LINK/PHY interface 30. Additional details regarding the operation of the various elements of the PHY layer controller 14 of FIG. 2 can be found in the above-referenced IEEE 1394 standard document. A typical commercially available PHY layer controller is the TSB14C01 5-V IEEE 1394–1995 Backplane Transceiver/Arbiter from Texas Instruments Inc. of Dallas Tex.

A significant problem with the conventional IEEE 1394 serial backplane interface 10 described in conjunction with FIGS. 1 and 2 above is that its data bandwidth is unduly limited. For example, the serial backplane interface 10 supports a serial backplane data bus 17 which is always only a single data bit wide. In other words, the conventional PHY layer controller 14 and the transceiver 16 as shown in FIGS. 1 and 2 are configured to process one data bit at a time. This limits the data transfer rate through the interface 10, and hence its effective data bandwidth, while also preventing the corresponding network node or other communication device from taking full advantage of the performance capabilities of its link layer circuitry. Increasing the data bandwidth in the conventional serial backplane interface 10 generally requires increasing the PHY layer clock frequency, which may not be a practical or desirable approach in a given application. A need therefore exists for an improved backplane PHY layer interface in which the effective data bandwidth can be increased without requiring a corresponding increase in the PHY layer clock frequency, while also maintaining compatibility with the basic IEEE 1394 serial bus architecture.

SUMMARY OF THE INVENTION

The invention provides a parallel backplane physical layer interface which has a scalable data bandwidth. In an illustrative embodiment, an interface is provided between a parallel backplane bus of a physical layer of a communication device and a higher layer of the device in a manner compatible with an existing serial bus architecture such as IEEE 1394. The interface includes a parallel backplane physical layer controller having multiple receive data lines for receiving data from the backplane bus, and multiple transmit data lines for transmitting data to the backplane bus. A transceiver is coupled between the physical layer controller and the backplane bus for implementing these multi-line data transmit and receive operations. A link layer controller is coupled to the parallel backplane physical layer controller, and communicates with the parallel backplane physical layer controller over a data bus. The parallel backplane physical layer controller can provide an effective data bandwidth which is greater than its operating clock rate. The parallel backplane physical layer controller may also be operative to support communications with the backplane bus using a plurality of different backplane bus widths, such as a single data bit bus width, a two data bit bus width, a four data bit bus width and an eight data bit bus width. The invention thus allows the throughput data bandwidth of the interface to be scaled by selecting one of the available data bus widths.

An advantage of the invention is that the data bandwidth of a given backplane physical layer interface can be significantly increased while maintaining the same physical layer clock frequency as a corresponding serial backplane interface. For example, the data bandwidth of a backplane physical layer interface operating at a clock rate of about 50 MHz can be increased by as much as eight times relative to the conventional IEEE 1394 serial backplane interface previously described. This allows the performance capabilities of link layer circuitry to be more effectively utilized. The increase in data bandwidth may be made selectable, such that a single interface device can support an IEEE 1394 compatible serial data bus as well as a number of different parallel backplane bus widths. The invention can also improve the noise performance of a serial backplane interface, e.g., in terms of electromagnetic interference (EMI) and electromagnetic compatibility (EMC), for a given data bandwidth, by reducing the clock frequency required to provide that bandwidth.

DETAILED DESCRIPTION OF THE INVENTION

The invention will be illustrated below in conjunction with an exemplary parallel backplane interface architecture. Although particularly well suited for use with circuitry configured in accordance with the IEEE 1394 standard, the invention may be applied to other types of backplane interface circuits, and to other interface applications. The parallel backplane interface architecture of the invention may be implemented in a network node or other communications device, such as, for example, a personal computer, a microprocessor, an application-specific integrated circuit or other data processing device, or a transmitter, receiver or other communication terminal. The invention is suitable for use in a wide variety of communication system applications, including wireless cellular systems, cable systems, satellite systems as well as other types of communication systems. The term "backplane bus" as used herein should be understood to include any arrangement of one or more data lines in a physical layer of a communication device. The term "effective data bandwidth" as used herein with reference to a backplane controller refers generally to the approximate bandwidth supported by the controller under a given set of operating conditions. For example, a controller providing an effective data bandwidth of 400 MHz may be implemented in accordance with the invention by using a backplane data bus width of eight bits and a physical layer clock rate of 50 MHz.

Figure 3:
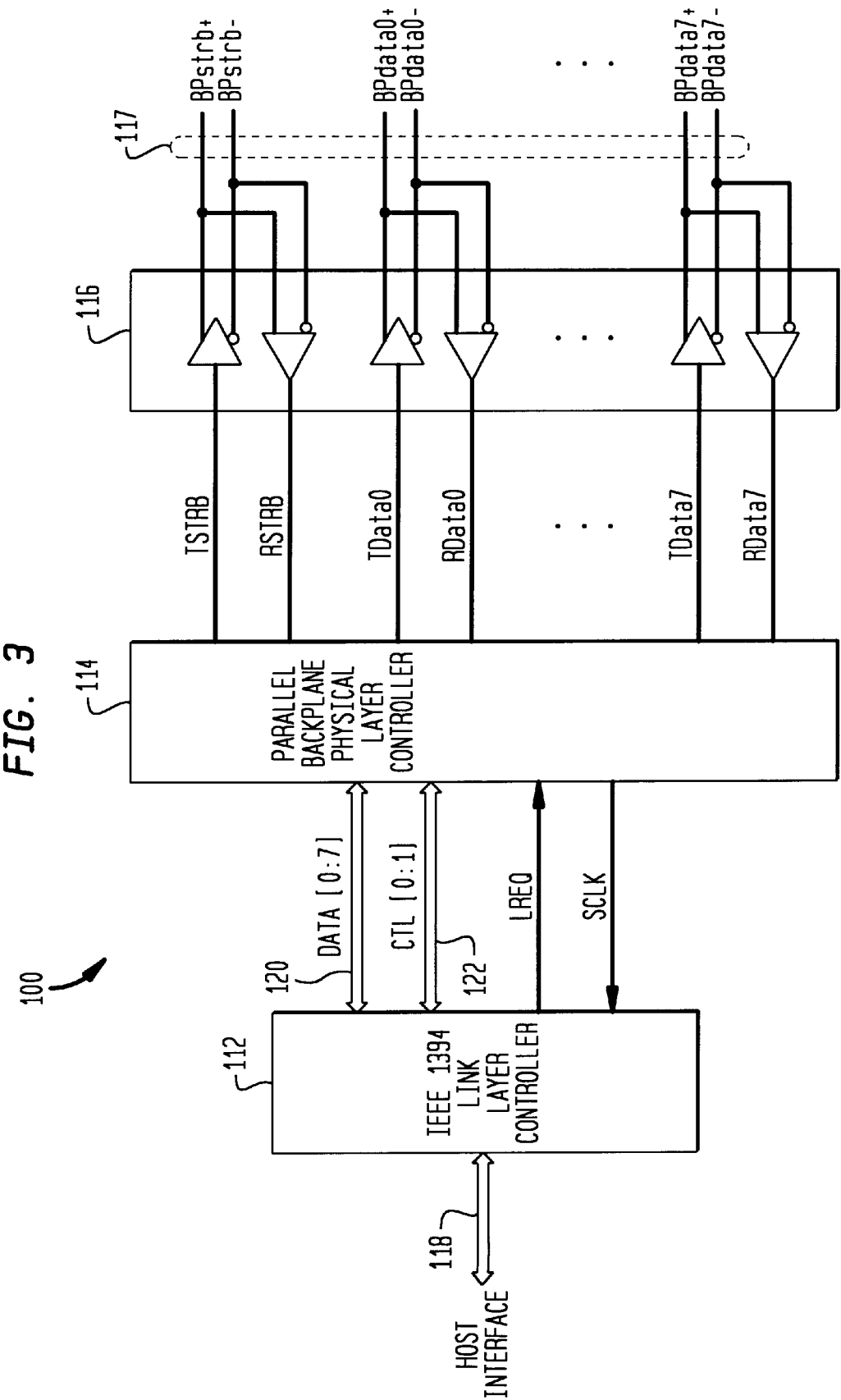
FIG. 3 is a block diagram of a parallel backplane physical layer interface configured in accordance with an illustrative embodiment of the invention.

FIG. 3 shows a parallel backplane interface 100 configured in accordance with an illustrative embodiment of the invention. The parallel backplane interface 100 includes a link layer controller 112, a parallel backplane PHY layer controller 114 and a backplane transceiver 116. The parallel backplane interface 100 in this embodiment provides an interface between a PHY layer parallel backplane bus 117 and higher-level layers within a network node or other communication device. The link layer controller 112 is configured to operate in accordance with the above-described IEEE 1394 standard to provide communications between a host interface 118, which is associated with one of the higher-level layers, and the PHY layer controller 114. A bidirectional DATA[0:7] data bus 120 between the link layer controller 112 and the PHY layer controller 114 has a width of eight bits. As mentioned above, typical conventional implementations generally make use of only two of the available eight data lines, i.e., data lines D0 and D1. It should be noted that the width of data bus 120 is exemplary only. As will be described in greater detail below, other widths may be used for data bus 120 in alternative embodiments of the invention. A control bus 122 between link layer controller 112 and PHY layer controller 114 includes the control signal lines designated CTL[0:1]. The CTL[0:1], LREQ and SCLK signal lines all operate in a manner similar to that described in the above-cited IEEE 1394 standards document.

The PHY layer controller 114 includes a transmit strobe output (TSTRB), a receive strobe input (RSTRB), eight transmit data outputs (TData0, TData1, . . . TData7) and eight receive data inputs (RData0, RData1, . . . RData7). These lines are connected to corresponding respective inputs and outputs of a backplane transceiver 116. The transceiver 116 also supports bidirectional backplane strobe signals (BPstrb+ and BPstrb−) and eight pairs of bidirectional backplane data signals (BPdata0+ and BPdata0−, BPdata1+ and BPdata1−, . . . BPdata7+ and BPdata7−). These strobe and data signal lines pass between the transceiver 116 and a parallel backplane bus 117. The PHY layer controller 114 and backplane transceiver 116 in this embodiment are thus configured to process up to eight bits of data simultaneously.

Figure 4:
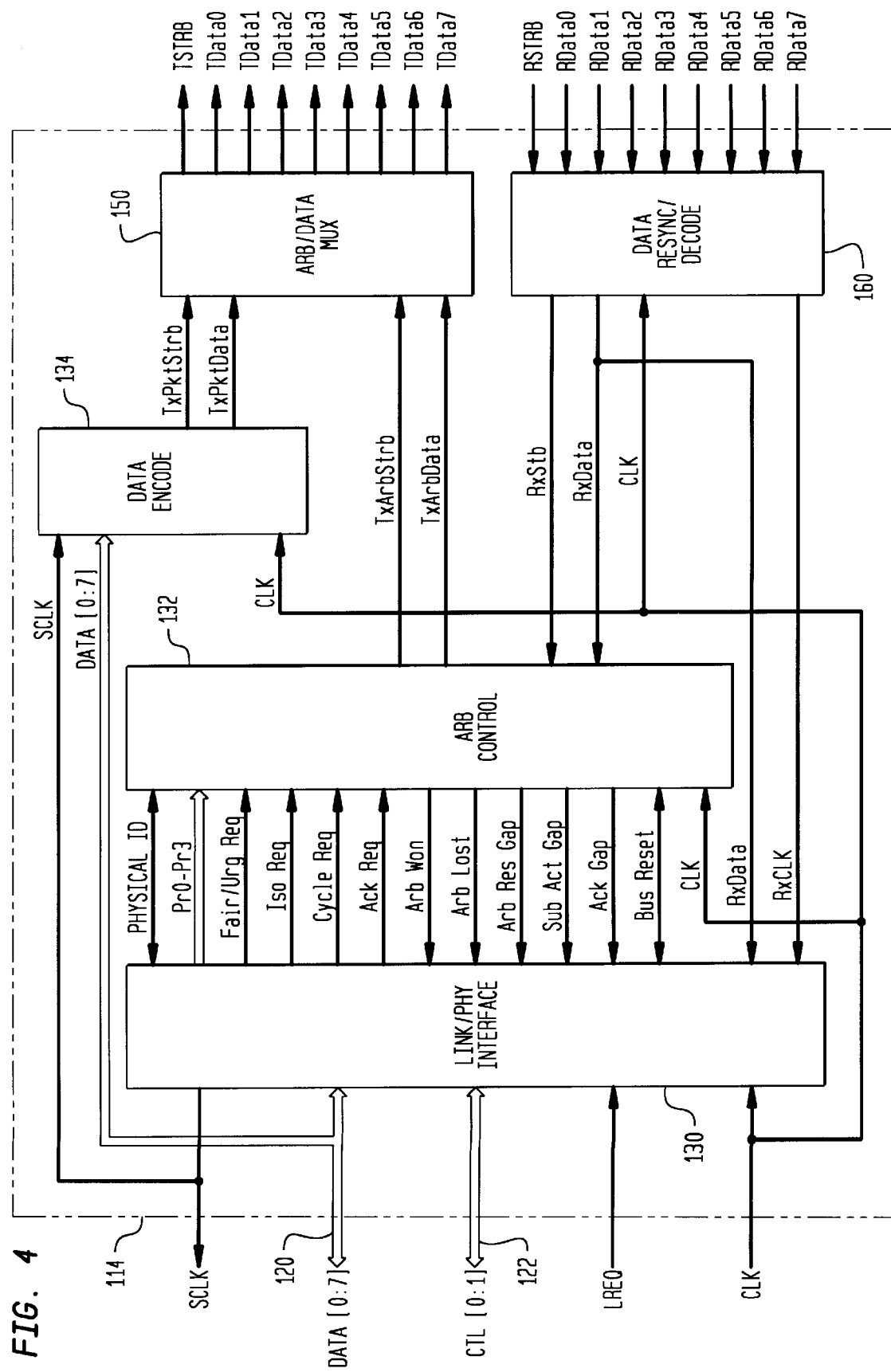
FIG. 4 shows a more detailed view of a parallel backplane physical layer controller suitable for use in the parallel backplane interface of FIG. 3 in accordance with the illustrative embodiment of the invention.

FIG. 4 shows the parallel backplane PHY layer controller 114 in greater detail. The controller 114 performs functions such as packet reception/transmission and arbitration, and includes a LINK/PHY interface 130, an arbitration control block 132, a data encode block 134, an arbitration/data multiplexer 150, and a data resynchronize/decode block 160. A local reference clock (CLK) is used for the synchronization of various state machines within the PHY layer controller 114. The frequency of this clock in an embodiment compatible with the IEEE 1394 standard may be maintained at 49.152 MHz (±100 ppm), regardless of the data transmission rate. Other clock rates could be used in alternative embodiments.

The arbitration/data multiplexer 150 in PHY layer controller 114 has a transmit packet strobe (TxPktStrb) input and a transmit packet data (TxPktData) input, and generates as outputs the TSTRB and TData0, TData1 . . . TData7 signals noted above. The data resynchronize/decode block 160 receives as inputs the RSTRB and RData0, RData1 . . . RData7 signals noted above, and generates as outputs a receive strobe (RxStrb) and receive data (RxData) signal. The PHY layer controller 114 is thus configured to operate with an eight-bit wide backplane data bus. The controller 114 receives the RSTRB and RData0, RData1 . . . RData7 signals from the parallel backplane bus 117 via the backplane transceiver 116, and supplies the TSTRB and TData0, TData . . . TData7 signals to the parallel bus 117 via the transceiver 116.

Figure 1:
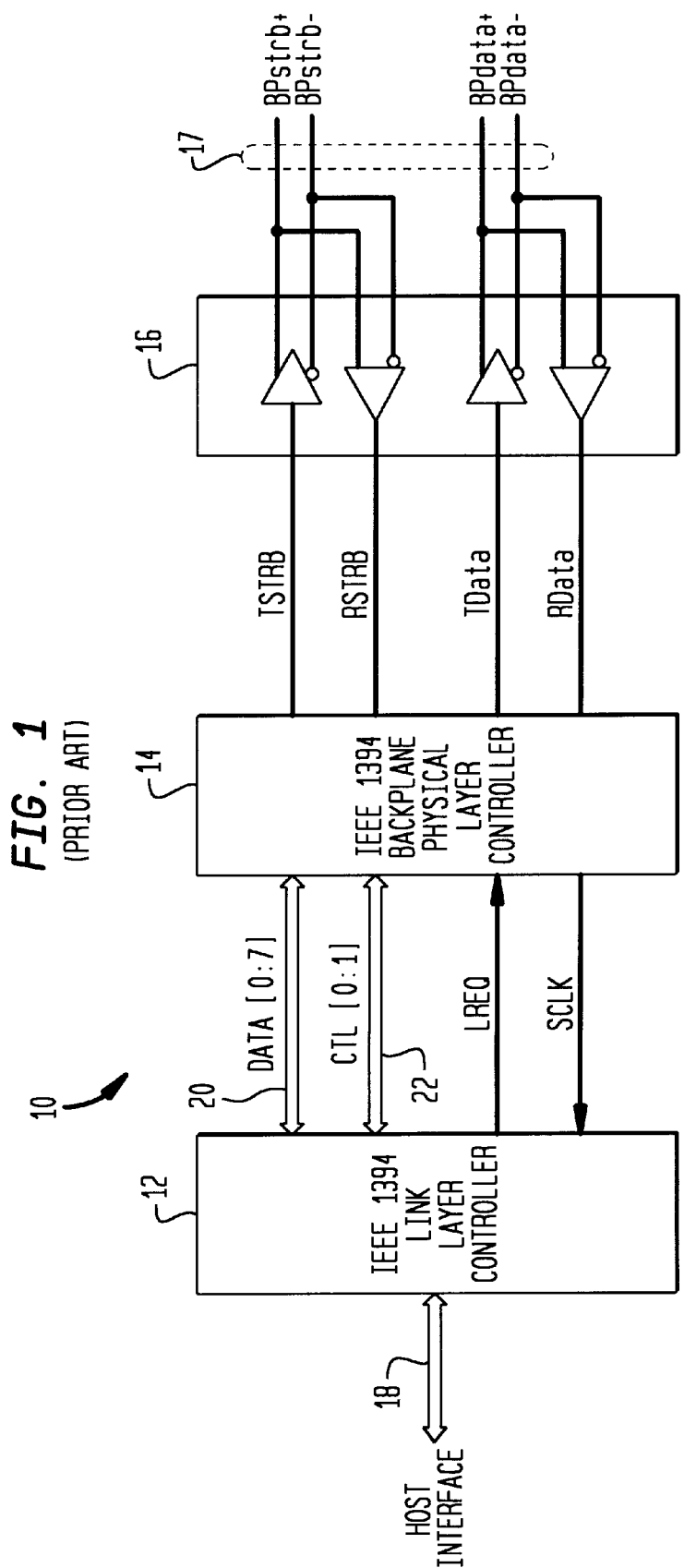
FIG. 1 is a block diagram of a conventional serial backplane interface configured in accordance with the IEEE 1394 standard.
Figure 2:
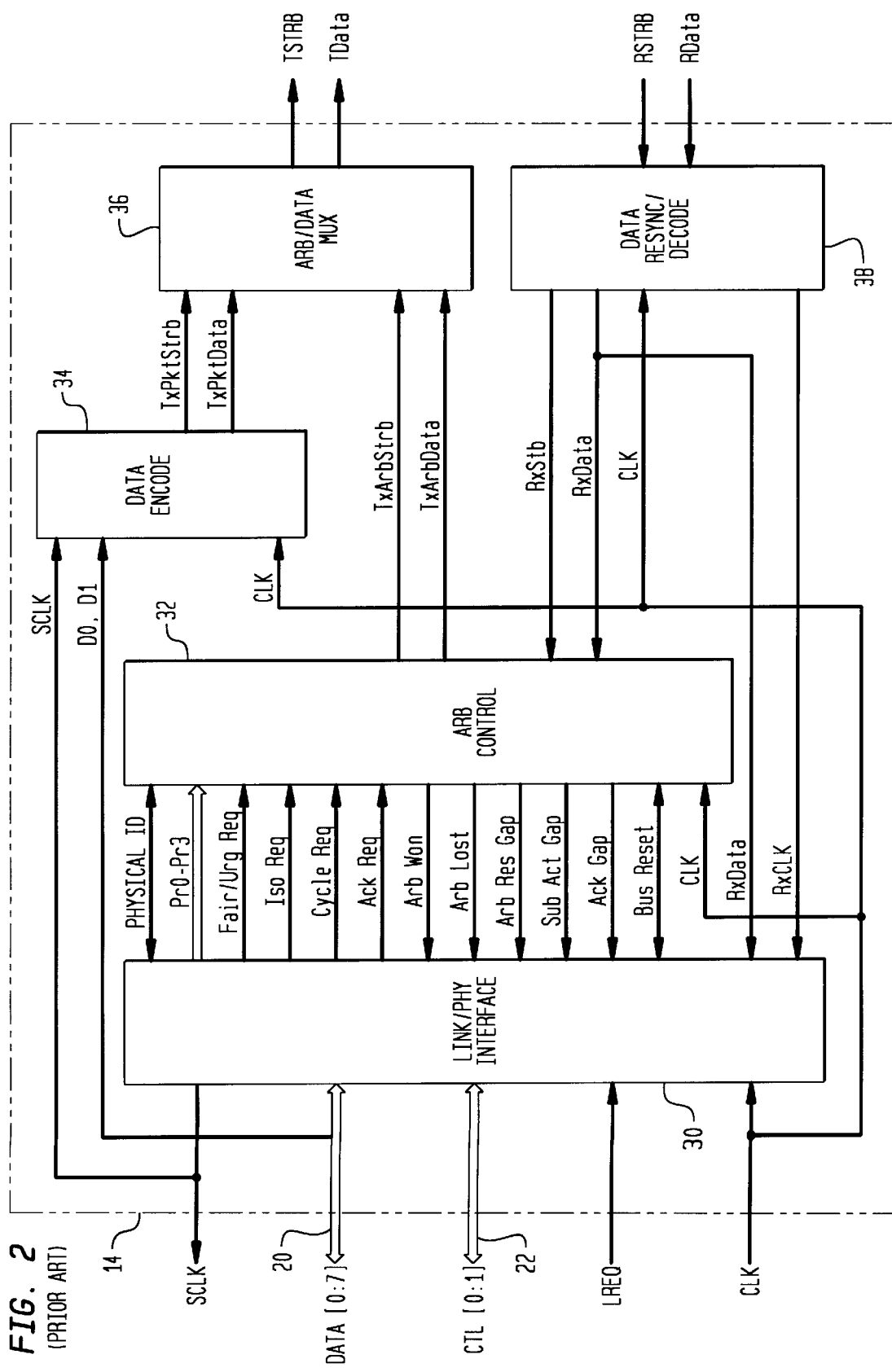
FIG. 2 shows a more detailed view of a serial backplane physical layer controller suitable for use in the conventional serial backplane interface of FIG. 1.

As in the conventional serial backplane interface 10 of FIG. 1, the four basic operations that can occur between the link layer controller 112 and the PHY layer controller 114 in the parallel backplane interface 100 are request, status, transmit and receive, and all but the request operation are initiated by the PHY layer controller 114. The link layer controller 112 uses the request operation to read or write an internal PHY register or to request the PHY layer controller 114 to initiate a transmit action. The PHY layer controller 114 initiates a status action when the status of the parallel backplane bus 117 changes. The PHY layer controller 114 initiates a transmit operation in response to a request from the link layer controller 112. The data bits to be transmitted are received over the DATA[0:7] lines from the link layer controller 112. These data bits are latched in the data encode block 134 of PHY layer controller 114 in synchronization with the system clock SCLK, encoded, and then transmitted by the arbitration/data multiplexer 150 on the TData0, TData1, . . . TData7 lines to the transceiver 116. The corresponding strobe information is transmitted by the arbitration/data multiplexer 150 on the TSTRB line to the transceiver 116.

The PHY layer controller 114 initiates a receive operation whenever a packet is received on the parallel backplane bus 117. The packet data is received in the data resynchronize/decode block 160 on the RData0, RData1, . . . RData7 lines from the transceiver 116 and the corresponding strobe information is received in block 160 on the RSTRB line. The received data-strobe information is decoded in block 160 to recover the receive clock (RxCLK) and the data bits. The data bits are then resynchronized to the local system clock, and sent to the associated link via L INK/PHY interface 130. The operation of elements 130, 132 and 134 of the controller 114 is substantially as described in the above-referenced IEEE 1394 standard document, with suitable modification to accommodate the wider backplane data bus. These modifications are straightforward and will be readily apparent to those skilled in the art, and are therefore not described in detail herein.

As noted previously, the parallel backplane interface 100 as shown in FIG. 3 operates with an eight-bit wide parallel backplane data bus 117. In accordance with the invention, the parallel backplane interface 100 may be made to operate with any of a number of other backplane data bus widths, in order to provide a scalable data bandwidth. For example, the parallel backplane interface 100 may provide a scalable data bandwidth in which the backplane data bus width is selectable as either 1 bit, 2 bits, 4 bits or 8 bits. TABLE 1 below shows the effective data bandwidth which is produced for each of these four exemplary bus widths, at three different approximate PHY layer clock rates. The conventional serial backplane interface 10 of FIG. 1 operates with a backplane bus width of one bit, and will therefore provide a data bandwidth of 25 MHz, 50 MHz or 100 MHz for approximate PHY layer clock rates of 25 MHz, 50 MHz or 100 MHz, respectively.

TABLE 1

| | Effective Data Bandwidth (MHz) | | |
|---|---|---|---|
| | PHY Layer Clock (MHz) | | |
| Bus Width | 25 | 50 | 100 |
| 1 bit | 25 | 50 | 100 |
| 2 bits | 50 | 100 | 200 |
| 4 bits | 100 | 200 | 400 |
| 8 bits | 200 | 400 | 800 |

The present invention thus allows the data bandwidth of the backplane interface to be scaled based on the width of the backplane data bus. For example, in an embodiment in which the backplane bus is eight bits wide, an effective data bandwidth of eight times the PHY layer clock rate, e.g., 400 MHz effective data bandwidth for a 50 MHz clock rate, can be provided. TABLE 1 further indicates that similar scaling of the interface data bandwidth can be provided for other backplane data bus widths, such as widths of two bits or four bits. The arbitration process provided in the parallel backplane interface 100 of FIG. 3 can be an otherwise conventional arbitration process modified in a straightforward manner to provide arbitration for backplane data bus widths of two, four or eight bits. A given parallel backplane interface configured in accordance with the invention may support each of the different data bus widths shown in TABLE 1, with the particular bus width used in a given application made selectable by inclusion of appropriate bus width selection circuitry. Such circuitry could be implemented in a straightforward manner by those skilled in the art and will therefore not be described in detail herein.

By providing a scalable data bandwidth, the invention can improve the noise performance of a backplane interface for a given effective data bandwidth. For example, because the invention reduces the clock frequency which would otherwise be required to support the given bandwidth, the amount of clock noise can be significantly reduced. This can allow the backplane interface to more easily meet the electromagnetic interference (EMI) and electromagnetic compatibility (EMC) requirements of a particular application.

It should be emphasized that the parallel backplane interface configuration of FIGS. 3 and 4 is intended to illustrate the operation of the invention, and therefore should not be construed as limiting the invention to any particular embodiment or group of embodiments. Other embodiments may use a variety of different types of logic circuitry and functions to implement the described parallel backplane control techniques. Backplane bus widths and PHY layer clock rates other than those described may also be used. These and numerous other alternative embodiments within the scope of the following claims will be apparent to those skilled in the art.

What is claimed is:

1. An apparatus for providing an interface in a communication device between a physical layer backplane bus of the device and a circuit associated with a higher layer of the device, the apparatus comprising:

a backplane physical layer controller having a plurality of data line inputs arranged to receive data from the backplane bus, and a plurality of data line outputs arranged to transmit data to the backplane bus, wherein the backplane physical layer controller provides a scalable effective data bandwidth which is greater than a physical layer clock rate of the backplane physical layer controller by adjustment of at least one of the physical layer clock rate and a number of input and output data lines utilized for actual data communication with the backplane bus; and a link layer controller coupled to the backplane physical layer controller via a data bus.

2. The apparatus of claim 1 wherein the link layer controller operates in accordance with the IEEE 1394 standard.

3. The apparatus of claim 1 wherein the backplane physical layer controller is operative to support communications with the backplane bus using a plurality of different backplane bus widths.

4. The apparatus of claim 1 wherein the backplane physical layer controller provides an effective data bandwidth which is n times the clock rate of the physical layer controller, where n is greater than or equal to two.

5. The apparatus of claim 1 further including a transceiver coupled between the backplane physical layer controller and the backplane bus, the transceiver having inputs coupled to the plurality of data line outputs of the backplane physical layer controller, outputs coupled to the plurality of data line inputs of the backplane physical layer controller, and corresponding input and output connections with the backplane bus.

6. The apparatus of claim 1 wherein the backplane physical layer controller is operative to provide a scalable effective data bandwidth.

7. The apparatus of claim 3 wherein the backplane physical layer controller is operative to select one of the different backplane bus widths for use at a particular time.

8. The apparatus of claim 3 wherein the plurality of different backplane bus widths includes at least a single data bit bus width, a two data bit bus width, a four data bit bus width and an eight data bit bus width.

9. A method for use in providing an interface in a communication device between a physical layer backplane bus of the device and a circuit associated with a higher layer of the device, the method comprising the steps of:

communicating between a backplane physical layer controller and the backplane bus, utilizing a plurality of receive data lines coupled between the physical layer controller and the backplane bus, and a plurality of transmit data lines coupled between the physical layer controller and the backplane bus, wherein the backplane physical layer controller provides an effective data bandwidth which is greater than a physical layer clock rate of the backplane physical layer controller;

selecting the effective data bandwidth from a number of different effective data bandwidths supported by the physical layer controller by adjustment of at least one of the physical layer clock rate and a number of the receive and transmit data lines utilized for actual data communication with the backplane bus; and communicating data between a link layer controller and the backplane physical layer controller via a data bus.

10. The method of claim 9 wherein the link layer controller operates in accordance with the IEEE 1394 standard.

11. The method of claim 9 further including the step of selecting one of a plurality of different backplane bus widths supported by the physical layer controller for communicating data between the physical layer controller and the backplane bus.

12. The method of claim 9 wherein the backplane physical layer controller provides an effective data bandwidth which is n times the clock rate of the physical layer controller, where n is greater than or equal to two.

13. The method of claim 11 wherein the plurality of different backplane bus widths includes at least a single data bit bus width, a two data bit bus width, a four data bit bus width and an eight data bit bus width.

14. An apparatus for providing an interface in a communication device between a physical layer backplane bus of the device and a circuit associated with a higher layer of the device, the apparatus comprising:

a backplane physical layer controller having a plurality of receive inputs arranged to receive data from the backplane bus, and a plurality of transmit outputs arranged to transmit data to the backplane bus; and a link layer controller coupled to the backplane physical layer controller, wherein an effective data bandwidth provided by the backplane physical layer controller is selectable based on adjustment of at least one of a physical layer clock rate and a number of the receive inputs and transmit outputs used for actual data communication with the backplane bus.

15. The apparatus of claim 14 wherein the backplane physical layer controller is operative to select one of a plurality of effective data bandwidths by selecting one of a plurality of different backplane bus widths.

16. The apparatus of claim 15 wherein the backplane physical layer controller is operative to select which of the different available backplane bus widths is used at a particular time.

17. The apparatus of claim 15 wherein the plurality of different backplane bus widths includes at least a single data bit bus width, a two data bit bus width, a four data bit bus width and an eight data bit bus width.

18. An apparatus for providing an interface in a communication device between a physical layer backplane bus of the device and a circuit associated with a higher layer of the device, the apparatus comprising:

a backplane physical layer controller having a plurality of data line inputs arranged to receive data from the backplane bus, and a plurality of data line outputs arranged to transmit data to the backplane bus, wherein the backplane physical layer controller provides an effective data bandwidth which is greater than an operating clock rate of the backplane physical layer controller, and wherein the backplane physical layer controller allows the higher layer circuit and at least one other circuit to commonly share the backplane bus; and a link layer controller coupled to the backplane physical layer controller via a data bus.

19. A method for use in providing an interface in a communication device between a physical layer backplane bus of the device and a circuit associated with a higher layer of the device, the method comprising the steps of:

communicating data between a backplane physical layer controller and the backplane bus, utilizing a plurality of receive data lines coupled between the physical layer controller and the backplane bus, and a plurality of transmit data lines coupled between the physical layer controller and the backplane bus, wherein the backplane physical layer controller provides an effective data bandwidth which is greater than a physical layer clock rate of the backplane physical layer controller by adjustment of at least one of the physical layer clock rate and a number of receive and transmit data lines utilized for actual data communication with the backplane bus, and wherein the backplane physical layer controller allows the higher layer circuit and at least one other circuit to commonly share the backplane bus; and communicating data between a link layer controller and the physical layer controller via a data bus.

20. An apparatus for providing an interface in a communication device between a physical layer backplane bus of the device and a circuit associated with a higher layer of the device, the apparatus comprising:

a backplane physical layer controller having a plurality of receive inputs arranged to receive data from the backplane bus, and a plurality of transmit outputs arranged to transmit data to the backplane bus; and a link layer controller coupled to the backplane physical layer controller, wherein an effective data bandwidth provided by the backplane physical layer controller is selectable based on a number of the receive inputs and transmit outputs used for actual data communication with the backplane bus, and wherein the backplane physical layer controller allows the higher layer circuit and at least one other circuit to commonly share the backplane bus.

* * * * *

UNITED STATES PATENT AND TRADEMARK OFFICE
CERTIFICATE OF CORRECTION

PATENT NO.   : 6,101,567
DATED        : August 8, 2000
INVENTOR(S)  : Kim et al.

It is certified that error appears in the above-identified patent and that said Letters Patent is hereby corrected as shown below:

<u>Title page,</u>
Item [56], the following publications should be listed as follows:
-- 3. EP 0 597 441 A1 5/18/94 Europe --
-- 4. WO 93/00640 1/7/93 PCT --
-- 5. A.J. Kunzman et al., "1394 High Performance Serial Bus: The Digital Interface for ATV," IEEE Transactions on Consumer Electronics, Vol. 41, No. 3, pp. 893-900, August 1995. --

<u>Column 8, claim 18,</u>
Lines 52-53, delete "an operating" and insert -- a physical layer --.
Line 54, after "controller" insert -- by adjustment of at least one of the physical layer clock rate and a number of input and output data lines utilized for actual data communication with the backplane bus --.

<u>Column 10, claim 20,</u>
Line 10, after "on" insert -- adjustment of at least one of a physical layer clock rate and --.

Signed and Sealed this

Second Day of April, 2002

*Attest:*

*Attesting Officer*

JAMES E. ROGAN
*Director of the United States Patent and Trademark Office*